United States Patent
Lee et al.

(10) Patent No.: US 7,625,770 B2
(45) Date of Patent: Dec. 1, 2009

(54) THIN FILM TRANSISTOR ARRAY SUBSTRATE AND FABRICATING METHOD THEREOF

(75) Inventors: Hyun Kyu Lee, Seoul (KR); See Hwa Jeong, Anyang-si (KR); Seung Chan Choi, Gyeongsan-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/320,131

(22) Filed: Jan. 16, 2009

(65) Prior Publication Data

US 2009/0137077 A1    May 28, 2009

Related U.S. Application Data

(62) Division of application No. 11/117,291, filed on Apr. 29, 2005, now Pat. No. 7,495,733.

(30) Foreign Application Priority Data

Apr. 29, 2004  (KR) ...................... 10-2004-0029869

(51) Int. Cl.
*H01L 21/00* (2006.01)
(52) U.S. Cl. .................. 438/30; 438/129; 438/149; 438/157; 257/E21.37; 257/E21.409; 257/E21.412
(58) Field of Classification Search .................. 438/23, 438/66, 161; 257/E21.094, E21.104, E21.37, 257/E21.457
See application file for complete search history.

(56) References Cited

U.S. PATENT DOCUMENTS

| 6,506,617 | B1 * | 1/2003 | Cheng .......................... 438/22 |
| 6,906,770 | B2 | 6/2005 | Kim et al. |
| 2004/0125260 | A1 | 7/2004 | Kim et al. |
| 2004/0263751 | A1 | 12/2004 | Kim et al. |
| 2005/0128410 | A1 | 6/2005 | Lee |

* cited by examiner

*Primary Examiner*—Savitri Mulpuri
*Assistant Examiner*—Cheung Lee
(74) *Attorney, Agent, or Firm*—McKenna Long & Aldridge LLP

(57) ABSTRACT

A liquid crystal display and a fabricating method thereof for improving an aperture ratio are disclosed. A liquid crystal display (LCD) according to the present invention includes a gate line, a data line and a common line on the thin film transistor array substrate, the gate line crossing the data line to define a pixel region; a thin film transistor near the crossing of the gate line and the data line; a common electrode connected to the common line in the pixel region; and a pixel electrode connected to the thin film transistor in the pixel area for forming an in-plane electric field in association with the common electrode during an operation of the LCD, wherein an edge of the pixel electrode overlaps the common line with at least one insulating layer therebetween, and an edge of the common electrode overlaps the pixel electrode with said at least one insulating layer therebetween.

5 Claims, 15 Drawing Sheets

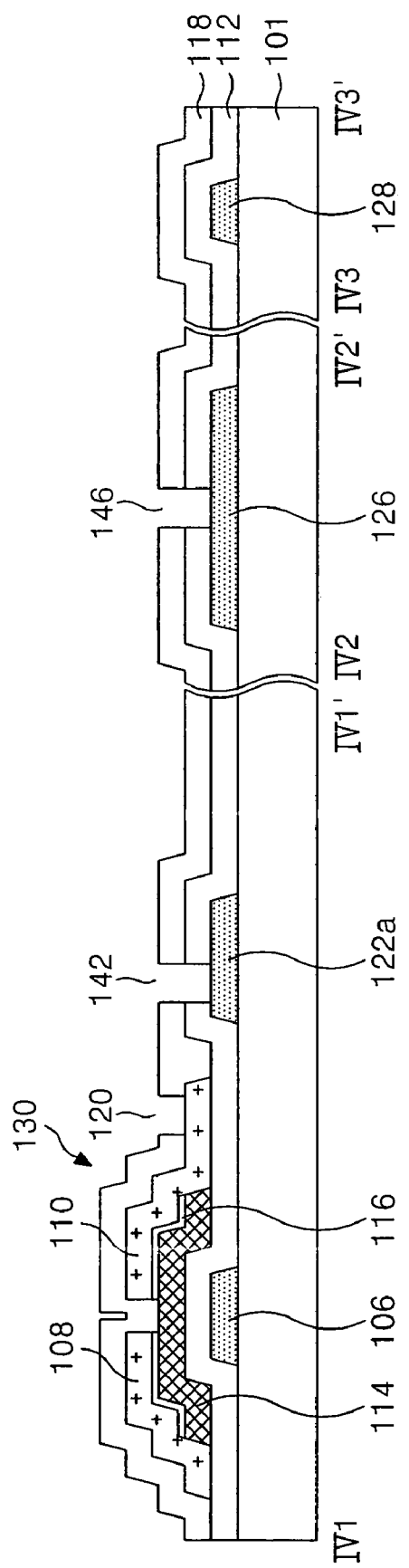

THIN FILM TRANSISTOR ARRAY SUBSTRATE AND FABRICATING METHOD THEREOF

This is application is a Divisional of application Ser. No. 11/117,291, filed Apr. 29, 2005, now U.S. Pat. No. 7,495,733, which claims teh benefit of Korean Patent Application No. 2004-29869, filed Apr. 24, 2004, each of which are hereby incorporated by reference as if fully set forth herein.

BACKGROUND OF THE INVENTION

1. Field of the Invention

The present invention relates to a liquid crystal display, and more particularly to a thin film transistor array substrate and a fabricating method thereof that are adaptive for improving an aperture ratio.

2. Discussion of the Related Art

Generally, liquid crystal displays (LCD) control light transmittance of liquid crystal using an electric field to thereby display pictures. Liquid crystal displays are largely classified into a vertical electric-field-type and a horizontal electric-field-type depending upon a direction of the electric field driving the liquid crystal.

An LCD of the vertical electric-field-type drives a liquid crystal in a twisted nematic (TN) mode with a vertical electric field formed between a pixel electrode and a common electrode arranged in opposition to each other on the upper and lower substrates. The LCD of the vertical electric-field-type has an advantage of a high aperture ratio while having a drawback of a narrow viewing angle of about 90°.

An LCD of the horizontal electric-field-type drives a liquid crystal in an in plane switch (IPS) mode with a horizontal electric field between a pixel electrode and a common electrode arranged in parallel with each other on the lower substrate. The LCD of the horizontal electric-field-type has an advantage of an wide viewing angle of about 160°.

Hereinafter, a liquid crystal display of the horizontal electric-field-type will be described in detail.

FIG. 1 is a plan view illustrating a structure of a thin film transistor array substrate of a horizontal electric-field-type LCD according to the related art, and FIG. 2 is a cross-sectional view of the thin film transistor array substrate taken along a II-II 'line in FIG. 1.

Referring to FIGS. 1 and 2, a thin film transistor array substrate according to the related art includes a gate line 2 and a data line 4 on a lower substrate 1 in such a manner to cross each other. The thin film transistor array substrate further includes a thin film transistor 30 near each crossing, a pixel electrode 22 and a common electrode 24 at a pixel area defined by the crossing between the gate and data lines for forming a horizontal electric field. The common electrode 24 is connected to a common line 26.

The gate line 2 applies a gate signal to a gate electrode 6 of the thin film transistor 30. The data line 4 applies a pixel signal, via a drain electrode 10 of the thin film transistor 30, to the pixel electrode 22. The common line 26 is formed in parallel to the gate line to apply a reference voltage to the common electrode 24 for driving the liquid crystal.

The thin film transistor 30 allows a pixel signal of the data line 4 to be charged and maintained in the pixel electrode 22 in response to a gate signal of the gate line 2. To this end, the thin film transistor 30 includes the gate electrode 6 connected to the gate line 2, a source electrode 8 connected to the data line 4, and a drain electrode 10 connected to the pixel electrode 22. Further, the thin film transistor 30 includes an active layer 14 overlapping the gate electrode 6, with a gate insulating layer 12 therebetween to define a channel between the source electrode 8 and the drain electrode 10, and an ohmic contact layer 16 for making an ohmic contact with the source electrode 8 and the drain electrode 10.

The pixel electrode 22 is connected, via a contact hole 20 in a protective layer 18, to the drain electrode 10 of the thin film transistor 30 and is provided at the pixel area 5. In particular, the pixel electrode 22 includes a horizontal part 22a connected to the drain electrode 10 and provided in parallel to adjacent gate lines 2, and a finger part 22b protruded from the horizontal part 22a in a direction parallel to the common electrode 24.

The common electrode 24 is connected to the common line 26 and is provided at the pixel area 5. In particular, the common electrode 24 is provided in parallel with the finger part 22b of the pixel electrode 22 at the pixel area 5.

Accordingly, a horizontal electric field can be formed between the pixel electrode 22 to which a pixel signal is supplied via the thin film transistor 30 and the common electrode 24 to which a reference voltage is supplied via the common line 26. In particular, a horizontal electric field can be formed between the finger part 22b of the pixel electrode 22 and the common electrode 24. When such a horizontal electric field is applied between the pixel and common electrodes 22 and 24, the liquid crystal molecules arranged in a horizontal direction between the thin film transistor array substrate and a color filter array substrate (upper substrate) rotate due to a dielectric anisotropy of the liquid crystal. An amount of light transmittance at the pixel area varies depending upon an extent of rotation of the liquid crystal molecules, thereby implementing gray-scale levels.

In the liquid crystal display of the horizontal electric-field-type according to the related art, the liquid crystal molecules at an area "A" between the common line 26 and an edge of the finger part 22b of the pixel electrode 22 and at an area "B" between an edge of the common electrode 24 and the horizontal part 22a of the pixel electrode 22 tend to respond differently than the liquid crystal molecules at other areas (for example, top part), when it is supplied with an electric field. In other words, the liquid crystal molecules at the areas "A" and "B" degrade picture quality by, for example, creating disclination, because they have a rotation angle and a rotation direction different from those of the liquid crystal molecules at other areas. As a result, there is a limit in increasing the aperture ratio to enhance the light transmittance of the LCD.

SUMMARY OF THE INVENTION

Accordingly, the present invention is directed to a liquid crystal display and method for fabricating the same that substantially obviates one or more of the problems due to limitations and disadvantages of the related art.

An advantage of the present invention is to provide a thin film transistor array substrate of a liquid crystal display and method for fabricating the same that is adaptive for improving an aperture ratio.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a thin film transistor array substrate includes a gate line; a data line crossing the gate line to define a pixel area; a common line formed in parallel to the data line; a thin film transistor near the crossing of the gate line and the data line; a common electrode connected to the common line and formed in parallel to the gate line at the pixel area; and a pixel electrode connected to the thin film transistor for forming a horizontal electric field with respect to the common electrode, wherein at least one edge of the pixel electrode overlaps the common line with at least one insulating layer therebetween, and at least one edge of the common electrode overlaps the pixel electrode with said at least one insulating layer therebetween.

In the thin film transistor array substrate, the pixel electrode includes a vertical part connected to the thin film transistor in parallel to the data line and overlapping with one edge of the common electrode; and a finger part formed in a plane different from the vertical part in such a manner to be overlapped with the vertical part, thereby making a horizontal electric field with respect to the pixel electrode.

Herein, said vertical part of the pixel electrode and said common line are formed from the same metal in the same plane, and said finger part of the pixel electrode and said common electrode are formed from the same metal in the same plane.

Said vertical part of the pixel electrode and said common line are formed from a gate metal on the substrate, and said finger part of the pixel electrode and said common electrode is formed from a transparent conductive material on said at least one layer of insulating layer provided in such a manner to cover the horizontal part of the pixel electrode and the common line.

In the thin film transistor array substrate, said common line is formed separately for each pixel area with having the gate line therebetween.

The thin film transistor array substrate further includes a first connection pattern extended from the common electrode positioned at the outermost portion of said pixel area to connect the common line separated for each pixel area; and a second connection pattern being in contact with the drain electrode and the pixel electrode to connect them to each other.

The thin film transistor array substrate further includes a first contact hole for exposing the drain electrode to contact the second connection pattern with the drain electrode; a second contact hole for exposing the vertical part of the pixel electrode to contact the second connection pattern with the vertical part of the pixel electrode; a third contact hole for exposing the vertical part of the pixel electrode to contact the vertical part of the pixel electrode with the finger part of the pixel electrode; and a fourth contact hole for exposing the common line to contact the common line with the common electrode.

The thin film transistor array substrate further includes a storage capacitor having a lower storage electrode protruded from the common line, and an upper storage electrode overlapping with the lower storage electrode with having at least one layer of insulating layer therebetween and connected to the pixel electrode.

Herein, said finger part of the pixel electrode and said common electrode positioned between the lower storage electrode and the pre-stage gate line are formed in parallel to each other in a first direction, and said finger part of the pixel electrode and said common electrode positioned between the lower storage electrode and the current-stage gate line are formed in parallel to each other in a second direction different from said first direction.

According to another aspect of the present invention, a method of fabricating a liquid crystal display (LCD) includes forming a first conductive pattern group including a gate line, a gate electrode connected to the gate line, a common line between the gate line and a pre-stage gate line in such a manner to cross the gate line and a vertical part of a pixel electrode parallel to the common line on a substrate; forming a gate insulating layer on the substrate provided with the first conductive pattern group; forming a semiconductor pattern on the gate insulating layer; forming a data line crossing the gate line to define a pixel area, a source electrode connected to the data line and a drain electrode opposed to the source electrode on the gate insulating layer provided with the semiconductor pattern; forming a protective layer on the substrate provided with the data line, the source electrode and the drain electrode; and forming a common electrode connected to the common line and overlapping the vertical part of the pixel electrode and a finger part of the pixel electrode overlapping the common line, the common electrode and the finger part of the pixel electrode forming a horizontal electric field during an operation of the LCD.

The method further includes the steps of forming a first connection pattern extended from the common electrode positioned at the outermost portion of said pixel area to connect the common line separated for each pixel area; and forming a second connection pattern being in contact with the drain electrode and the pixel electrode to connect them to each other.

In the method, said step of forming the protective layer provided with the data line, the source electrode and the drain electrode includes forming a first contact hole passing through the protective layer to expose the drain electrode, thereby contacting the second connection pattern with the drain electrode; forming a second contact hole passing through the gate insulating layer and the protective layer to expose the common line, thereby contacting the vertical part of the pixel electrode and the second connection pattern; forming a third contact hole passing through the gate insulating layer and the protective layer to expose the vertical part of the pixel electrode, thereby contacting the vertical part of the pixel electrode with the finger part thereof; and forming a fourth contact hole passing through the gate insulating layer and the protective layer to expose the common line, thereby contacting the common line with the common electrode.

The method further includes the step of forming a storage capacitor having a lower storage electrode protruded from the common line, and an upper storage electrode overlapping with the lower storage electrode with having at least one layer of insulating layer therebetween and connected to the pixel electrode.

Herein, said step of forming the common electrode and the finger part of the pixel electrode on the protective layer includes forming said finger part of the pixel electrode and said common electrode positioned between the lower storage electrode and the pre-stage gate line in parallel to each other in a first direction, and said finger part of the pixel electrode; and forming said common electrode positioned between the lower storage electrode and the current-stage gate line in parallel to each other in a second direction different from said first direction.

In yet another aspect of the present invention, a liquid crystal display (LCD) includes a gate line, a data line and a common line on the thin film transistor array substrate, the gate line crossing the data line to define a pixel region; a thin film transistor near the crossing of the gate line and the data line; a common electrode connected to the common line in the pixel area; and a pixel electrode connected to the thin film transistor in the pixel region for forming an in-plane electric field in association with the common electrode during an operation of the LCD, wherein an edge of the pixel electrode overlaps the common line with at least one insulating layer therebetween, and an edge of the common electrode overlaps the pixel electrode with said at least one insulating layer therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 9A and FIG. 9B are a plan view and a cross-sectional view illustrating a fabrication process for forming the protective layer having the contact holes shown in FIG. 3 and FIG. 4.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout the drawings to refer to the same or like parts.

Figure 1:
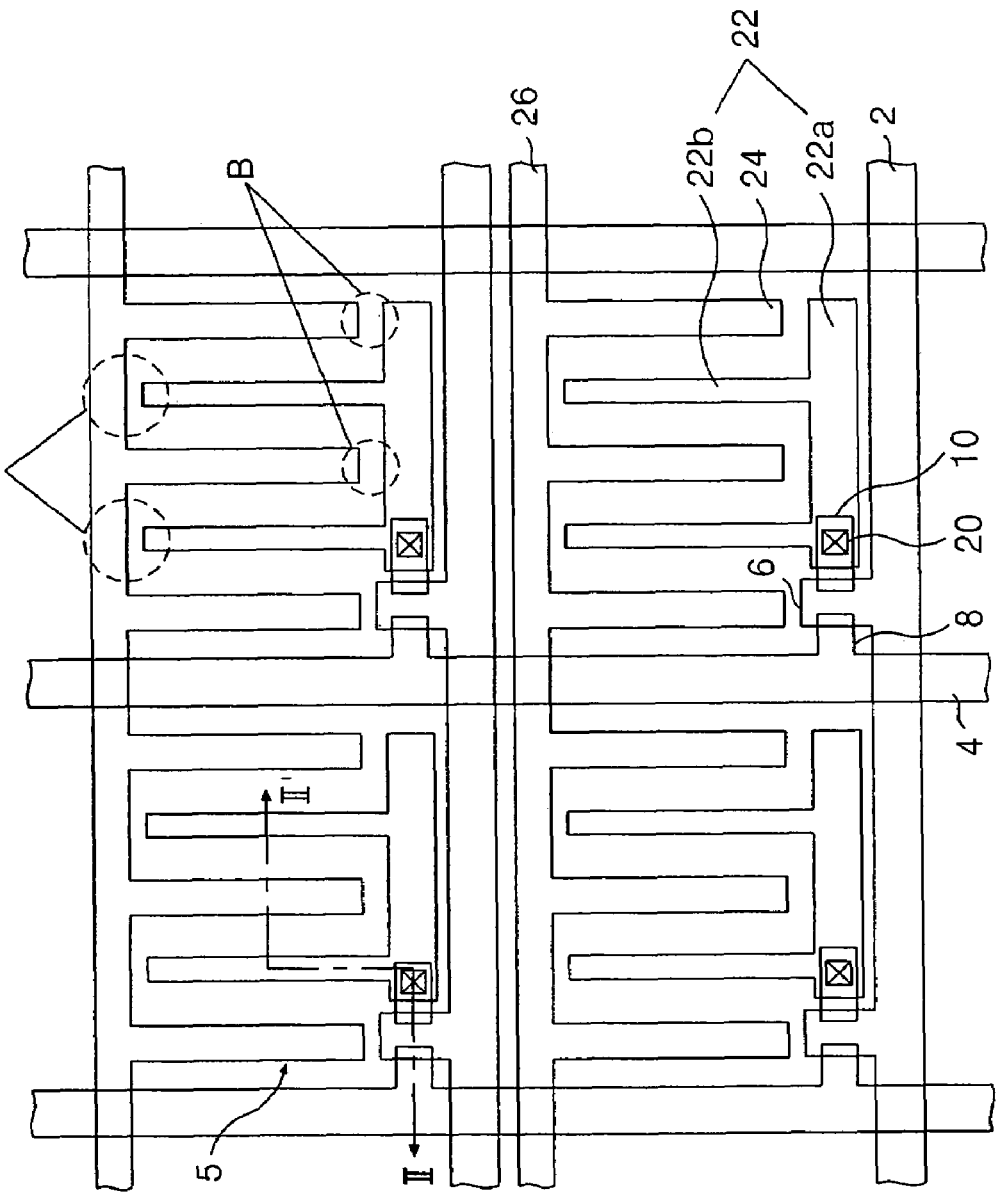
FIG. 1 is a plan view illustrating a structure of a thin film transistor array substrate of a horizontal electric-field-type LCD according to the related art.
Figure 2:
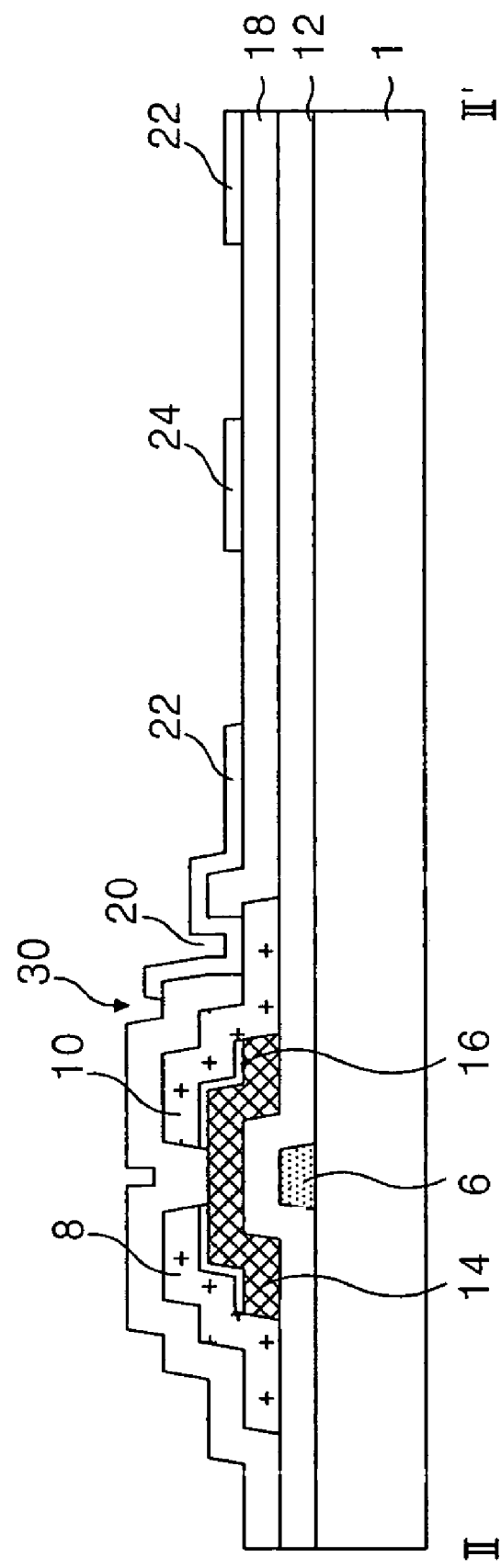
FIG. 2 is a cross-sectional view of the thin film transistor array substrate taken along a II-II' line in FIG. 1.
Figure 3:
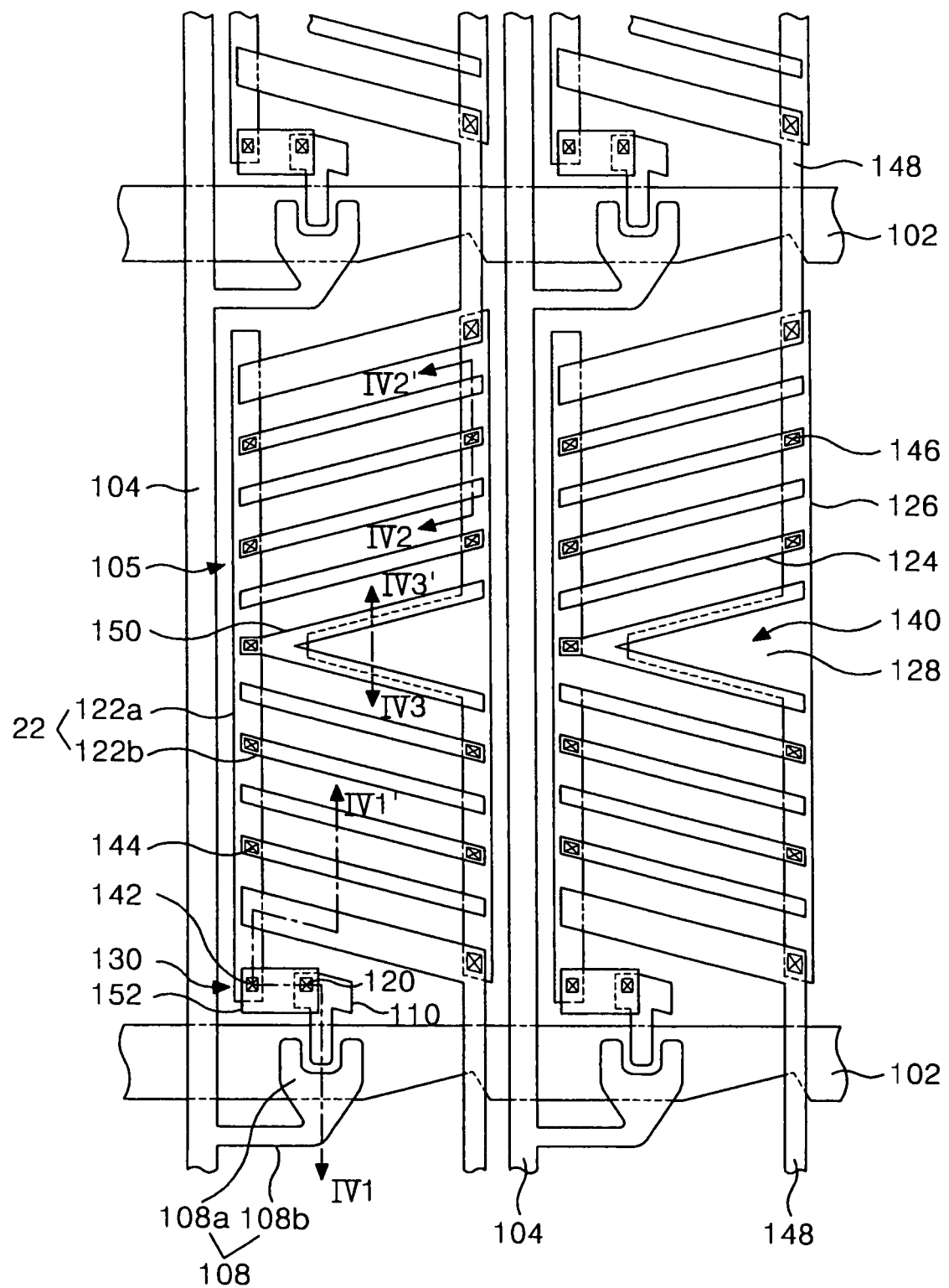
FIG. 3 is a plan view illustrating a structure of a thin film transistor array substrate according to an embodiment of the present invention.
Figure 4:
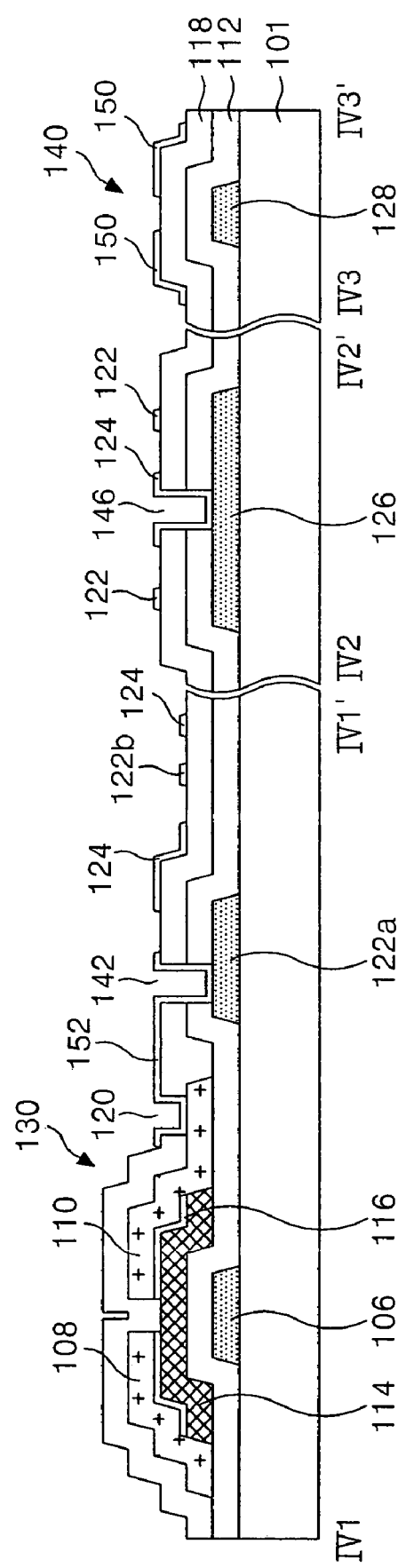
FIG. 4 is a cross-sectional view of the thin film transistor array substrate taken along lines of IV1-IV1', IV2-IV2' and IV3-IV3' in FIG. 3.

FIG. 3 is a plan view illustrating a structure of a thin film transistor array substrate according to an embodiment of the present invention, and FIG. 4 is a cross-sectional view of the thin film transistor array substrate taken along lines of IV1-IV1', IV2-IV2' and IV3-IV3' in FIG. 3.

Referring to FIGS. 3 and 4, a thin film transistor array substrate of a liquid crystal display (LCD) according to an embodiment of the present invention includes a gate line 102 and a data line 104 on a lower substrate 101 in such a manner to cross each other. The thin film transistor array substrate further includes a thin film transistor 130 near each crossing, a pixel electrode 122 and a common electrode 124 at a pixel area 105 defined by the crossing for forming a horizontal electric field (or an in-plane electric field). The common electrodes 124 are connected to a common line 126.

The gate line 102 applies a gate signal to a gate electrode 106 of the thin film transistor 130. The data line 104 applies a pixel signal, via a drain electrode 110 of the thin film transistor 130, to the pixel electrode 122. The common line 126 applies a reference voltage to the common electrode 124 for driving liquid crystal provided between the lower substrate 101 and a upper substrate (not shown). The common line 126 is provided in parallel to the data line 104 and is electrically connected to the common line 126 at an adjacent pixel area 105, via a first connection pattern 148 and the common electrode 124 positioned at the outermost portion of the pixel area 105. The common line 126 is formed of the same material (for example, metal) as the gate line 102 on the same plane or formed of the same material as the data line 104 on the same plane. For instance, when the common line 126 is formed of the same metal as the data line 104 on the same plane, an electrical short between the data line 104 and the common line may occur. Thus, it is desirable that the common line 126 is formed of the same metal as the gate line 102 in such a manner to be insulated from the data line 104.

Figure 5:
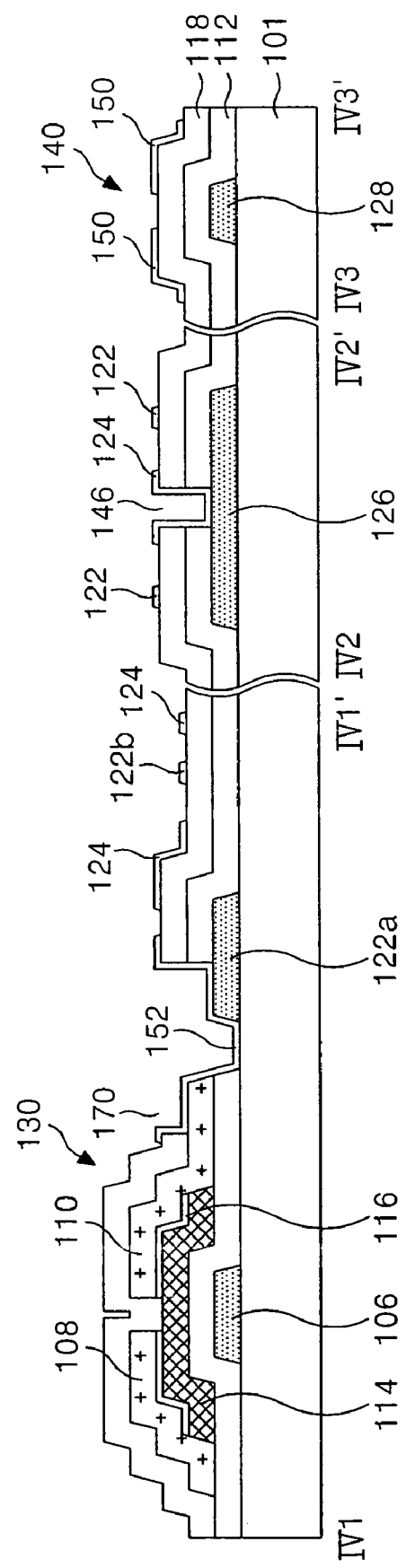
FIG. 5 is a cross-sectional view of the thin film transistor array substrate in which the first and second contact holes shown in FIG. 3 are integrally formed.

The thin film transistor 130 allows a pixel signal of the data line 104 to be charged and maintained in the pixel electrode 122 in response to a gate signal of the gate line 102. To this end, the thin film transistor 130 includes the gate electrode 106 connected to the gate line 102, a source electrode 108 connected to the data line 104 and a drain electrode 110 connected to the pixel electrode 122. The source electrode 108 includes a first source part 108b protruded from the data line 104, and a second source part 108a protruded in two directions from the first source part 108b to have a "U" shape. The drain electrode 110 is formed in such a manner to be opposed to the second source part 108a of the source electrode 108 to have a "U"-shaped channel. Further, the drain electrode 110 is in contact with a second connection pattern 152 via a first contact hole 120 in a protective layer 118. This second connection pattern 152 is in contact with a vertical part 122a of the pixel electrode 122 via a second contact hole 142 passing through the protective layer 118 and the gate insulating layer 112. Alternatively, the second connection pattern 152 contacts the drain electrode 110 and the pixel electrode 122 via the first and second contact holes 120 and 142, but they may contact the drain electrode 110 and the pixel electrode 122 via a single contact hole 170, as illustrated in FIG. 5.

The thin film transistor 130 further includes an active layer 114 overlapping the gate electrode 106, with the gate insulating layer 112 therebetween, and an ohmic contact layer 116 contacts the source electrode 108 and the drain electrode 110 for making an ohmic contact. Herein, the ohmic contact layer 116 is formed to have a "U" shape to expose the active layer 114.

The pixel electrode 122 is connected to the drain electrode 110 of the thin film transistor 130 via the first contact hole 120, the second connection pattern 152 and the second contact hole 142, and is provided at the pixel area 105. In particular, the pixel electrode 122 includes the vertical part 122a formed in parallel to the data line 104 on the substrate, and a finger part 122b contacting the vertical part 122a via a third contact hole 144 passing through the gate insulating layer 112 and the protective layer 118. Herein, the finger part 122b is aligned toward the common line 126 to form a desired angle with respect to the vertical part 122a, and is formed in parallel to the pixel electrode 124. The vertical part 122a of the pixel electrode is formed of the same material as the gate line 102, while the finger part 122b thereof is formed of the same transparent conductive material as the common electrode 126. An edge of the finger part 122b of the pixel electrode is formed in such a manner to overlap the common line 126 and the vertical part 122a of the pixel electrode, thereby preventing a degradation of picture quality such as disclination.

The common electrode 124 is connected to the common line 126 and is provided at the pixel area 105. The common electrode 124 is formed in parallel to the finger part 122b of the pixel electrode. The common electrode 124 is in contact with the common line 126 via a fourth contact hole 146 passing through the gate insulating layer 112 and the protective layer 118. An edge of the common electrode 124 is formed in such a manner to overlap the common line 126 and the vertical part 122a, thereby preventing a degradation of picture quality such as disclination.

In such a thin film transistor array substrate, a horizontal electric field is formed between the pixel electrode 122 to which a pixel signal is supplied via the thin film transistor 130 and the common electrode 124 to which a reference voltage is supplied via the common line 126. In particular, a horizontal electric field is formed between the finger part 122b of the pixel electrode 122 and the common electrode 124. When such a horizontal electric field is applied, the liquid crystal molecules arranged in a horizontal direction between the thin film transistor array substrate (lower substrate) and the color filter array substrate (upper substrate) rotate due to a dielectric anisotropy of the liquid crystal. An amount of light transmittance at the pixel area 105 varies depending upon an extent of rotation of the liquid crystal molecules, thereby implementing gray-scale levels.

A storage capacitor 140 includes a lower storage electrode 128 connected to the common line 126 and an upper storage electrode connected to the pixel electrode 122 and overlapping the lower storage electrode 128 with the gate insulating layer 112 and the protective layer 118 therebetween. Such a storage capacitor 140 allows a pixel signal charged in the pixel electrode 122 to be stably maintained until the next pixel signal is charged.

As illustrated in FIG. 3, the lower storage electrode 128 is protruded from the common line 126 in such a manner to have a "V" shape, with lengths of two opposed sides being equal to each other. In other words, the pixel electrodes 122 and the common electrodes 124 positioned between the lower storage electrode 124 and the pre-stage gate line (i.e., the gate line for the adjacent pixel) are formed in parallel to each other in a first direction in which one of the two sides of the lower storage electrode 128 is aligned. Further, the pixel electrode 122 and the common electrode 124 positioned between the lower storage electrode 128 and the current-stage gate line (i.e., the gate line for the current pixel) are formed in parallel to each other in a second direction in which the other side of the lower storage electrode 128 is aligned. Thus, the first direction forms a predetermined angle with respect to the second direction.

Accordingly, when a horizontal electric field is applied between the pixel electrode 122 and the common electrode 124 in the pixel area, the liquid crystal molecules between the lower storage electrode 128 and the pre-stage gate line are arranged in the first direction, while the liquid crystal molecules between the lower storage electrode 128 and the current-stage gate line are arranged in the second direction, thereby forming a multiple domain structure. Thus, birefringence of light at the pixel area 105 according to the alignment directions of the liquid crystal can be canceled or compensated with respect to each other, thereby minimizing a color shift phenomenon and a gray level inversion phenomenon.

In the thin film transistor array substrate above described, an edge of the finger part of the pixel electrode overlaps the common line and an edge of the common electrode overlaps the vertical part of the pixel electrode. Thus, a disclination phenomenon can be minimized to improve the aperture ratio. Further, the finger part of the pixel electrode and the common electrode are formed on the protective layer (i.e., on the same plane), so that a horizontal electric field between the two electrodes is not weakened by, for example, the protective layer and/or the gate insulating layer. Thus, the LCD device can be driven with a low voltage as compared with the LCD according to the related art where there is at least one insulating layer between the two electrodes. Furthermore, because the finger part of the pixel electrode and the common electrode are formed on the same plane, the horizontal electric field can be uniformly applied within the entire pixel area, thereby preventing or minimizing degradation of picture quality such as a residual image phenomenon, etc.

FIG. 6A to FIG. 10B are plan views and cross-sectional views illustrating a method of fabricating a thin film transistor array substrate of an LCD according to an embodiment of the present invention.

Figure 6A:
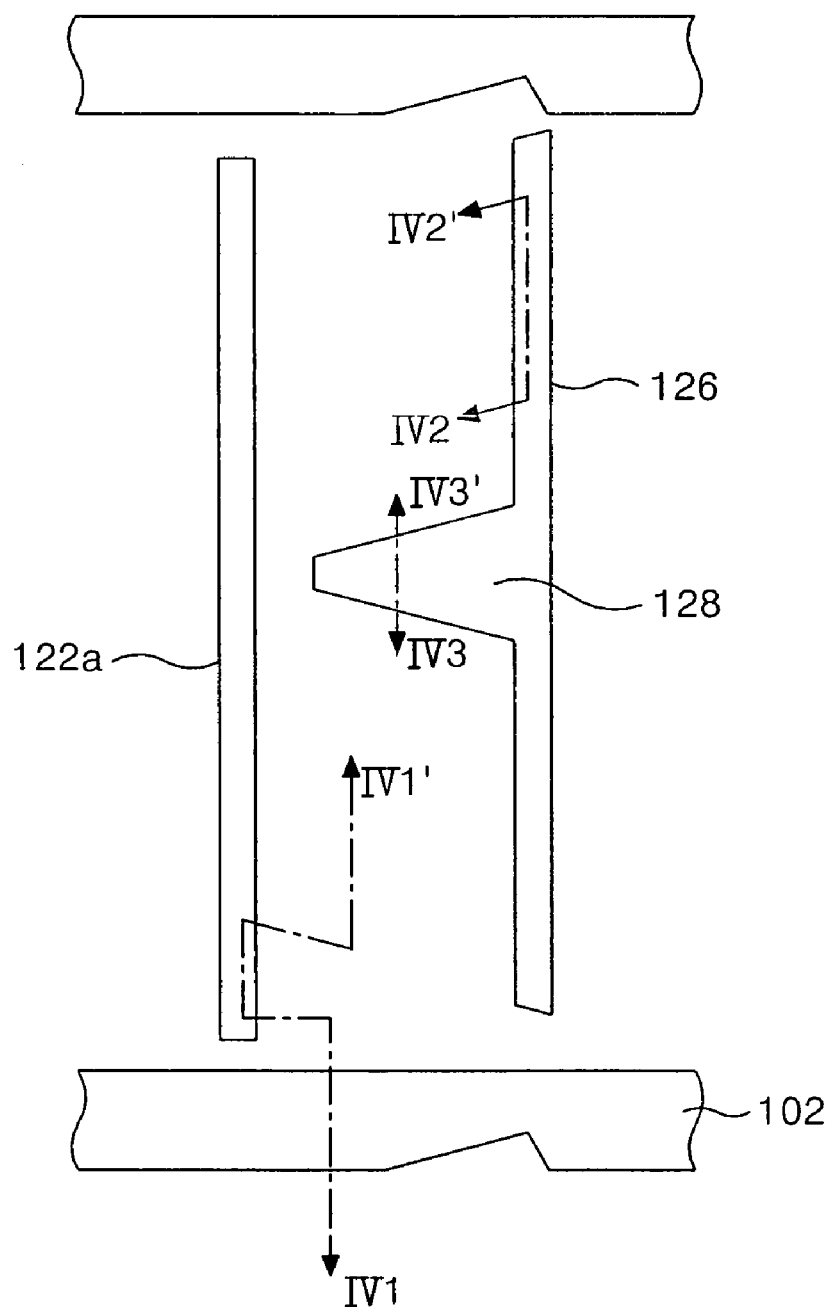
FIG. 6A and FIG. 6B are a plan view and a cross-sectional view illustrating a fabrication process for forming the first conductive pattern group shown in FIG. 3 and FIG. 4.
Figure 6B:
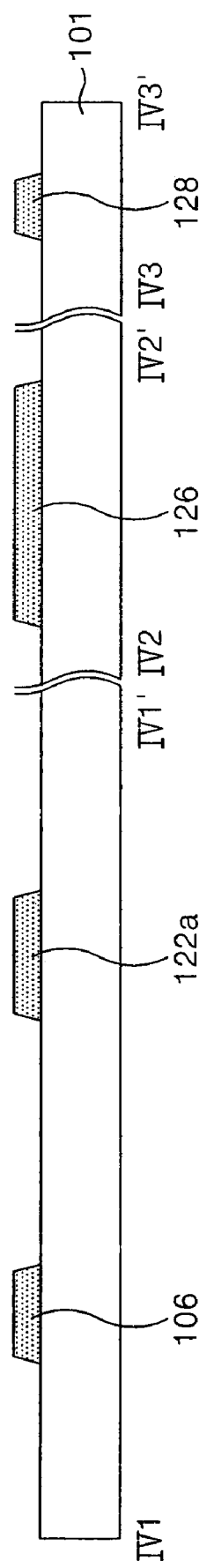

Referring to FIGS. 6A and 6B, a first conductive pattern group including a gate line 102, a gate electrode 106, a common line 126, a vertical part 122a of a pixel electrode and a lower storage electrode 128 is formed on a lower substrate 101. More specifically, a first conductive layer is formed on the lower substrate 101 by a deposition technique such as sputtering. Herein, the first conductive layer includes at least a single layer formed of a conductive material aluminum group metal, molybdenum (Mo), copper (Cu), chrome (Cr), etc. In this example, the first conductive layer (or gate metal layer) has a two-layer structure in which aluminum/neodium (AlNd) and molybdenum are sequentially deposited. The first conductive layer is then patterned by a photolithography process and an etching process to thereby form the first conductive pattern group including the gate line 102, the common line 126, the vertical part 122a of the pixel electrode and the lower storage electrode 128.

Figure 7A:
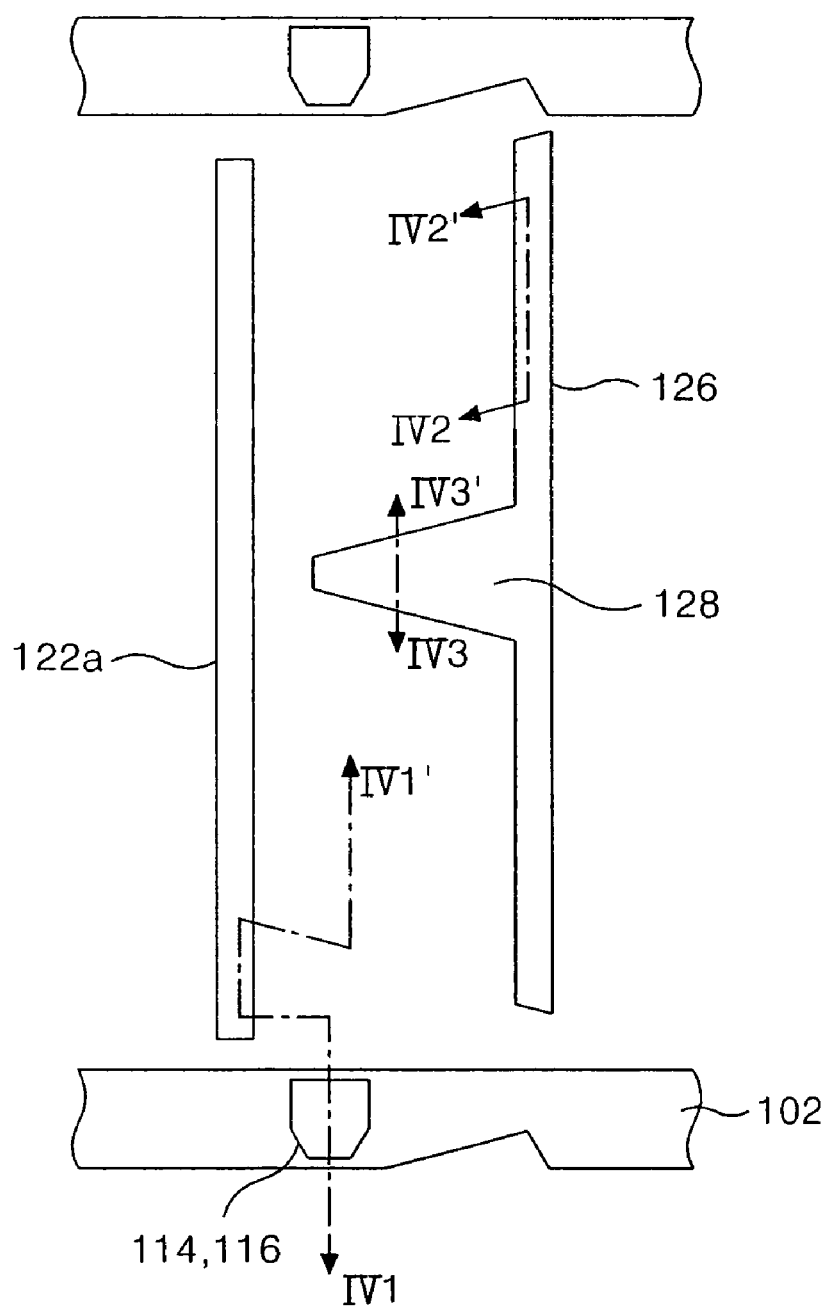
FIG. 7A and FIG. 7B are a plan view and a cross-sectional view illustrating a fabrication process for forming the semiconductor pattern group shown in FIG. 3 and FIG. 4.
Figure 7B:
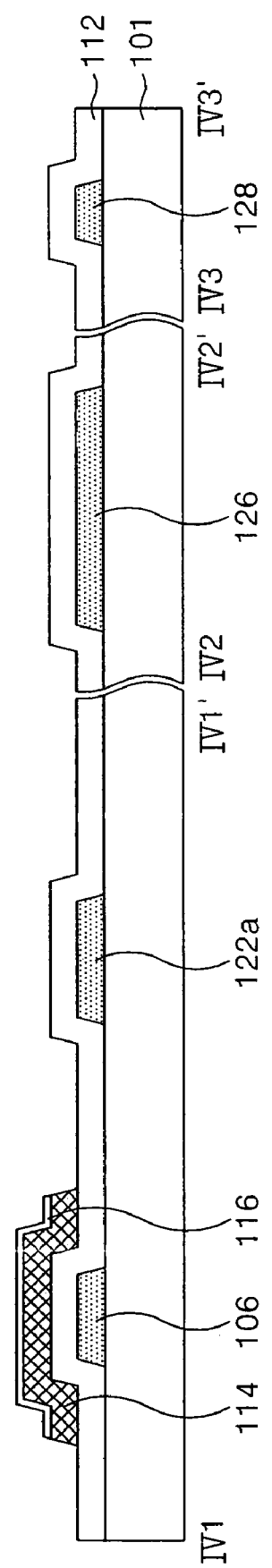

Referring to FIGS. 7A and 7B, a gate insulating layer 112 is formed on the lower substrate 101 provided with the first conductive pattern group. Further, a semiconductor pattern including an active layer 114 and an ohmic contact layer 116 is formed on the gate insulating layer 112. More specifically, the gate insulating layer 112 and first and second semiconductor layers are sequentially formed on the lower substrate 101 provided with the first conductive pattern group by a deposition technique such as PECVD (plasma enhanced chemical vapor deposition), sputtering, etc. Herein, the gate insulating layer 112 is formed of an inorganic insulating material such as silicon nitride ($SiN_x$) or silicon oxide ($SiO_x$), or an organic insulating material such as an acrylic organic compound, BCB (benzocyclobutene), PFCB (perfluorocyclobutane), etc. The first semiconductor layer is formed of intrinsic amorphous silicon, while the second semiconductor layer is formed of amorphous silicon doped with an N-type or P-type impurity. Then, the first and second semiconductor layers are patterned by a photolithography process sand an etching process to thereby form the semiconductor pattern including the active layer 114 and the ohmic contact layer 116.

Figure 8A:
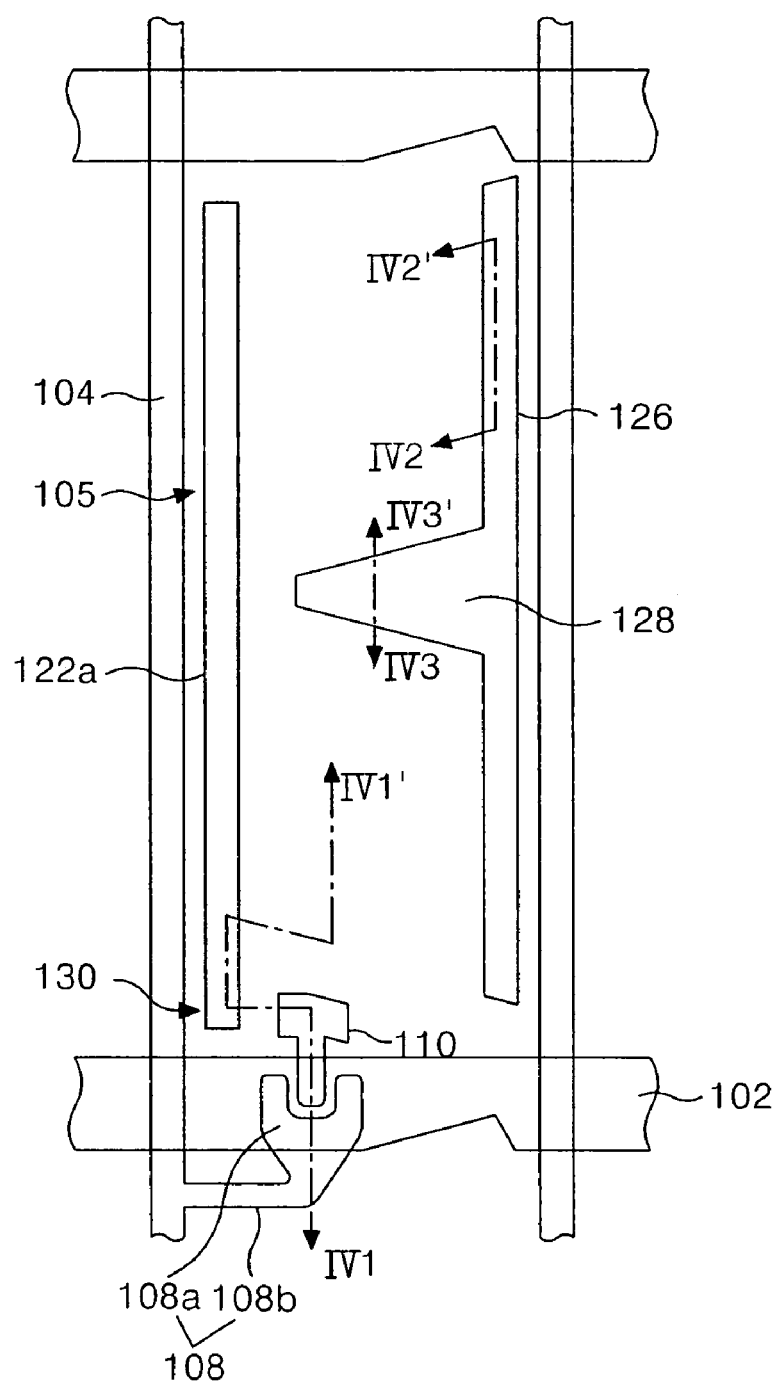
FIG. 8A and FIG. 8B are a plan view and a cross-sectional view illustrating a fabrication process for forming the second conductive pattern group shown in FIG. 3 and FIG. 4.
Figure 8B:
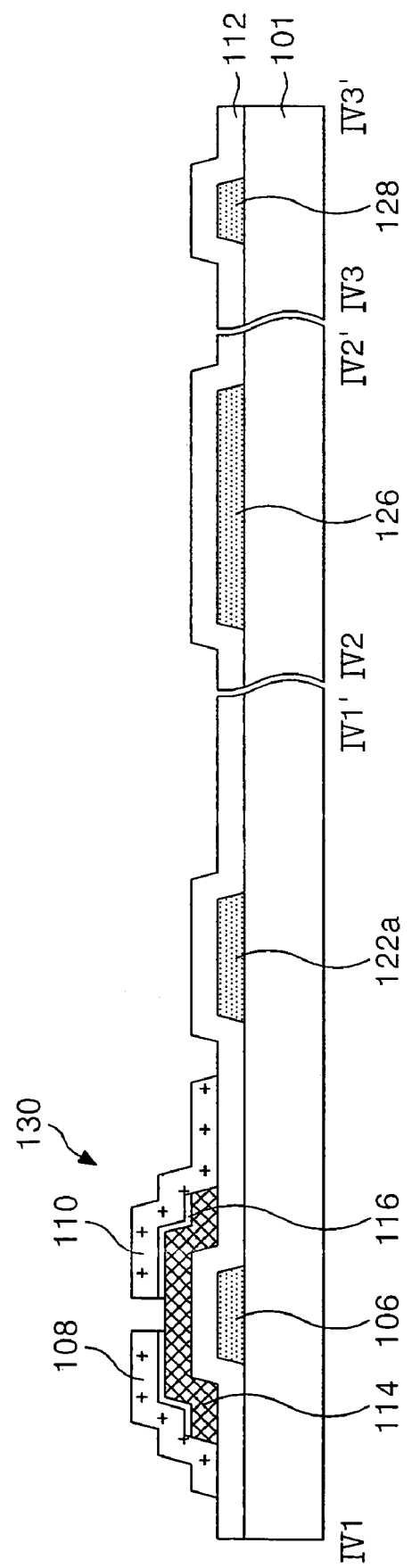

Referring to FIGS. 8A and 8B, a second conductive pattern group including a source electrode 108, a drain electrode 110 and a data line 104 is formed on the gate insulating layer 112 provided with the semiconductor pattern. To this end, a second conductive layer is sequentially formed on the gate insulating layer 112 and the semiconductor pattern by a deposition technique such as sputtering or the like. Herein, the second conductive layer is formed of a conductive material such as copper (Cu), molybdenum (Mo), titanium (Ti), tantalum (Ta), molybdenum alloy, etc. The second conductive layer (or data metal layer) is patterned by a photolithography process and an etching process to provide the second conductive pattern group including the data line 104, the source electrode 108 and the drain electrode 110.

Then, the ohmic contact layer at the channel portion exposed by the source and drain electrodes 108 and 110 is dry-etched by using the source electrode 108 and the drain electrode 110 as a mask, thereby exposing the active layer 114 at the channel portion.

Figure 9A:
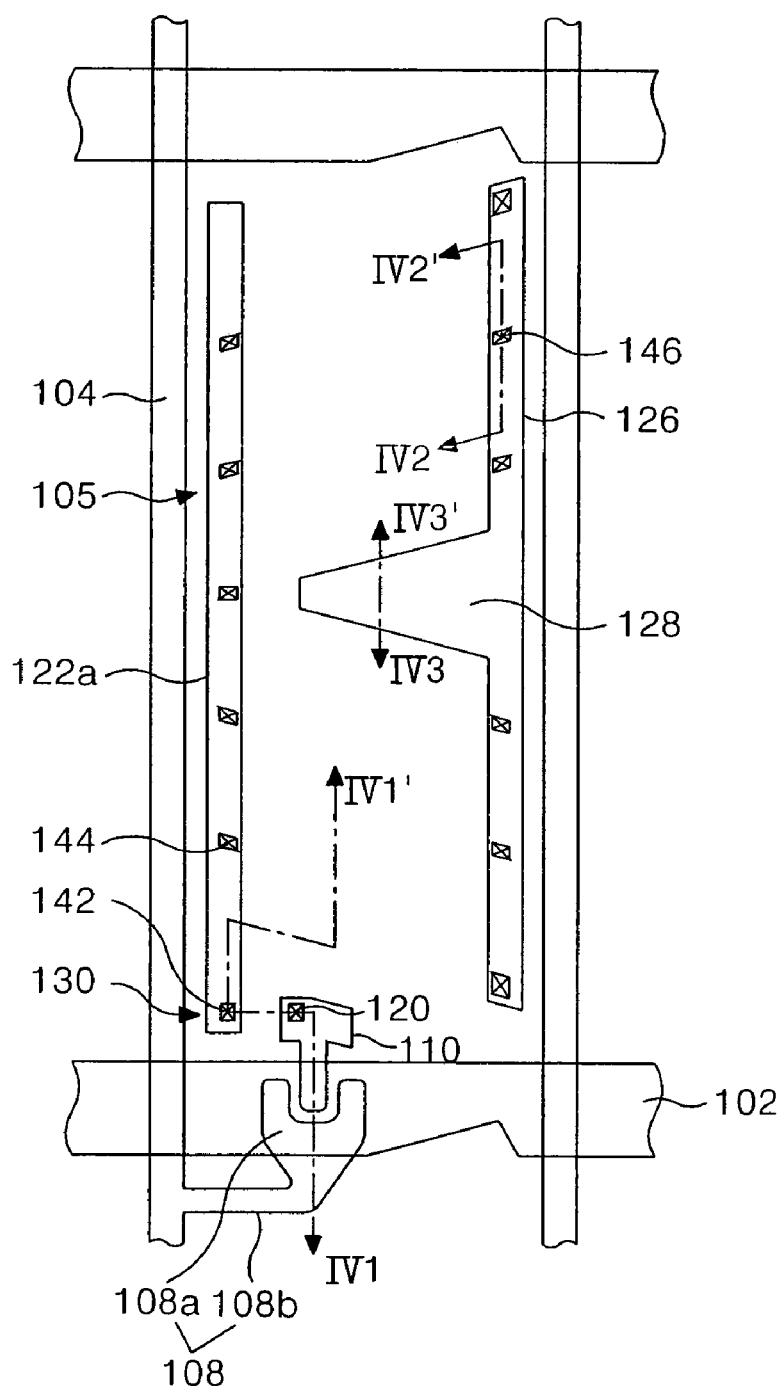

Referring to FIGS. 9A and 9B, a protective layer 118 including first to fourth contact holes 120, 142, 144 and 146 is formed on the gate insulating layer provided with the second conductive pattern group. To this end, the protective layer 118 is entirely formed on the gate insulating layer 112 provided with the second conductive pattern group by a deposition technique such as PECVD, etc. Herein, the protective layer 118 is made of an inorganic insulating material similar to the gate insulating pattern 112, or an organic insulating material such as an acrylic organic compound having a small dielectric constant, BCB (benzocyclobutene) or PFCB (perfluorocyclobutane), etc. The protective layer 118 is patterned by a photolithography process and an etching process to provide the first to fourth contact holes 120, 142, 144 and 146. The first contact hole 120 passes through the protective layer 118 to expose the drain electrode 110. The second and third contact holes 142 and 144 pass through the protective layer 118 and the gate insulating layer 112 to expose the vertical part 122a of the pixel electrode. The fourth contact hole 146 passes through the protective layer 118 and the gate insulating layer 122 to expose the common line 126.

Figure 10A:
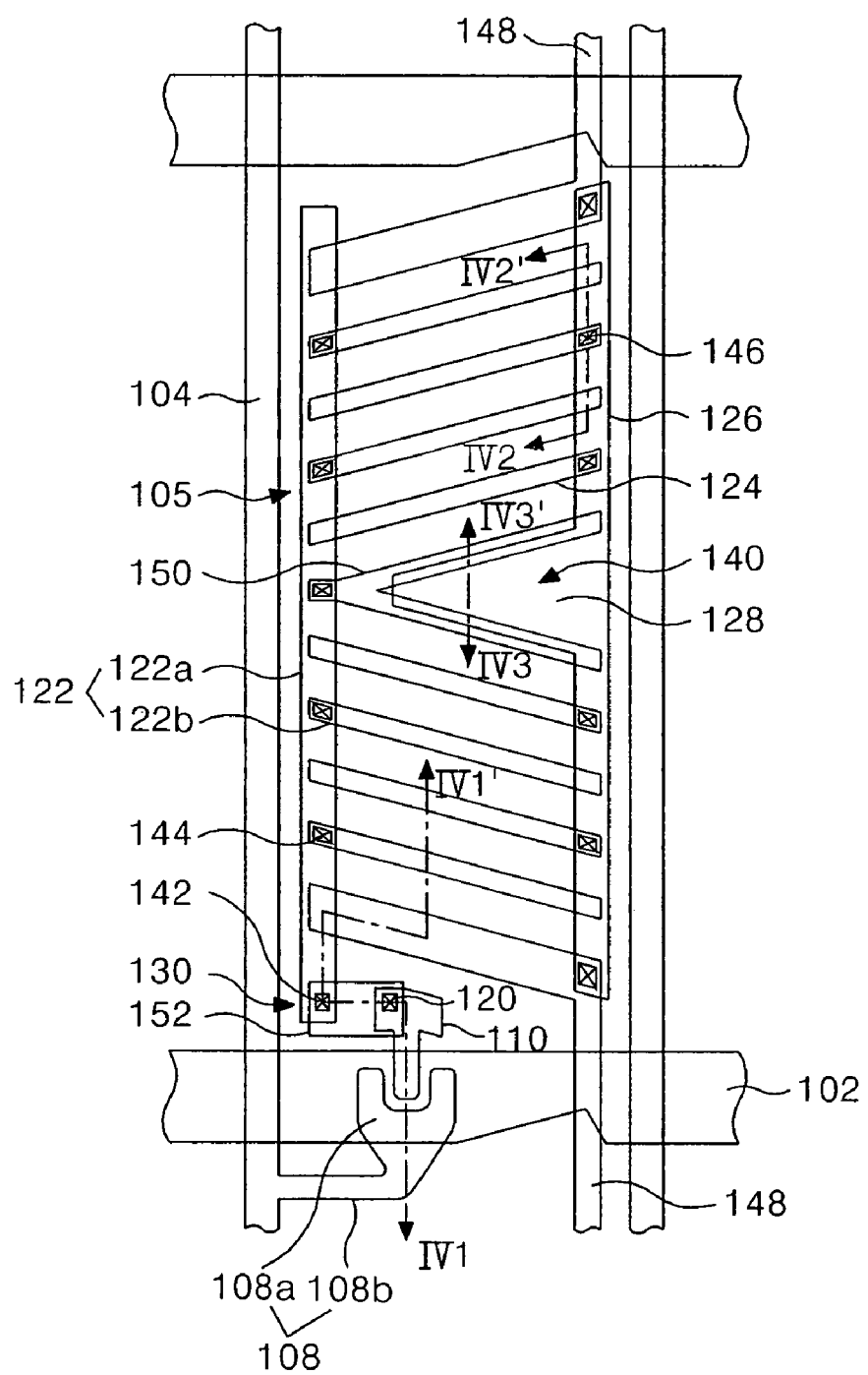
FIG. 10A and FIG. 10B are a plan view and a cross-sectional view illustrating a fabrication process for forming the third conductive pattern group shown in FIG. 3 and FIG. 4.
Figure 10B:
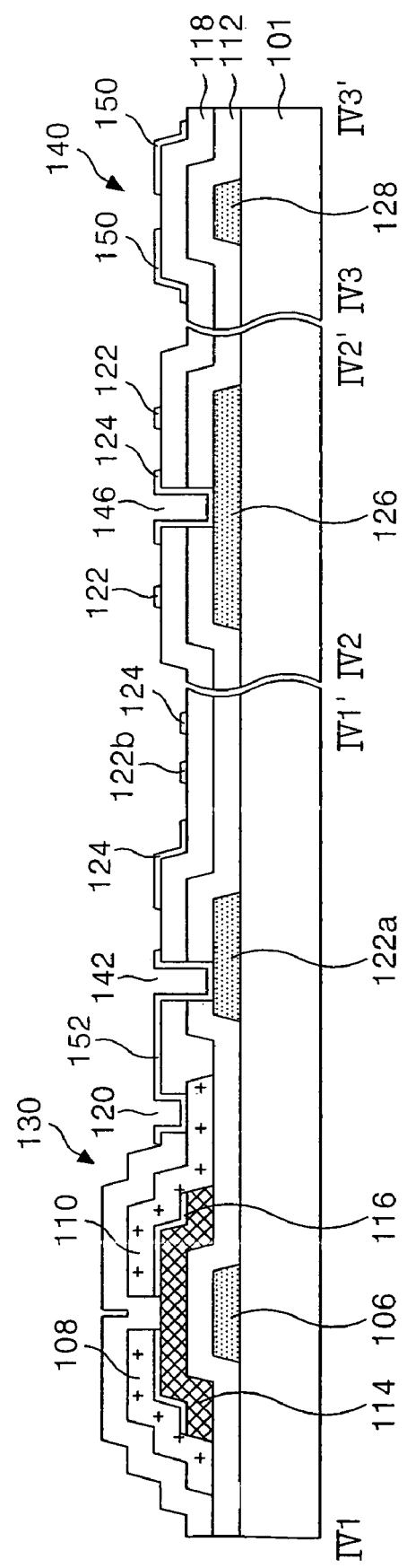

Referring to FIGS. 10A and 10B, a third conductive pattern group including a finger part 122b of the pixel electrode, a common electrode 124, first and second connection patterns 148 and 152 and upper storage electrode 150 is formed on the protective layer 160. To this end, a third conductive layer, for example, a transparent conductive layer is formed on the protective layer 118 by a deposition technique such as sputtering, etc. Herein, the transparent conductive layer is made of indium-tin-oxide (ITO), tin-oxide (TO), indium-tin-zinc-oxide (ITZO), indium-zinc-oxide (IZO), etc. Then, the transparent conductive layer is patterned by a photolithography process and an etching process to thereby provide the third conductive pattern group including the finger part 122b of the pixel electrode, the common electrode 124, the first and second connection patterns 148 and 152 and the upper storage electrode 150. The second connection pattern 152 is connected to the drain electrode 110 via the first contact hole 120, and the finger part 122b is connected to the vertical part 122a of the pixel electrode via the third contact hole 144. The common electrode 124 is connected to the common line 126 via the fourth contact hole 146. The first connection pattern 148 is extended from the common electrode positioned at the outermost portion of the pixel area.

As described above, the thin film transistor array substrate is formed by using a five-mask process. However, it should be appreciated that the thin film transistor array substrate may be formed by a process that uses less than five masks. For instance, the semiconductor pattern and the second conductive pattern group can be simultaneously formed by employing a diffractive mask or a half-tone mask, so that the thin film transistor array substrate can be fabricated by a four-mask process.

As described above, according to the present invention, an edge of the finger part of the pixel electrode overlaps the common line and an edge of the common electrode overlaps the vertical part of the pixel electrode. As a result, a declination generating area can be minimized or prevented, which leads to an improved aperture ratio. Further, the finger part of the pixel electrode and the common electrode are formed on the protective layer. Accordingly, a strength of a horizontal electric field applied between the two electrodes is not weakened by the protective layer and the gate insulating layer. Thus, an LCD according to the present invention can be driven with a low voltage. Furthermore, because the finger part of the pixel electrode and the common electrode are formed on the same plane, the horizontal electric field can be uniformly applied with the entire pixel area, thereby preventing or minimizing degradation of picture quality such as a residual image phenomenon, etc.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display (LCD) comprising:
    forming a first conductive pattern group including a gate line, a gate electrode connected to the gate line, a common line between the gate line and a pre-stage gate line in such a manner to cross the gate line and a vertical part of a pixel electrode parallel to the common line on a substrate;
    forming a gate insulating layer on the substrate provided with the first conductive pattern group;
    forming a semiconductor pattern on the gate insulating layer;
    forming a data line crossing the gate line to define a pixel area, a source electrode connected to the data line and a drain electrode opposed to the source electrode on the gate insulating layer provided with the semiconductor pattern;
    forming a protective layer on the substrate provided with the data line, the source electrode and the drain electrode; and
    forming a common electrode connected to the common line and overlapping the vertical part of the pixel electrode and a finger part of the pixel electrode overlapping the common line, the common electrode and the finger part of the pixel electrode forming a horizontal electric field during an operation of the LCD.

2. The method according to claim 1, further comprising:
    forming a first connection pattern extended from the common electrode positioned at the outermost portion of said pixel area to connect the common lines separated for each pixel area; and
    forming a second connection pattern being in contact with the drain electrode and the pixel electrode to connect them to each other.

3. The method according to claim 2, wherein forming the protective layer further includes:
    forming a first contact hole passing through the protective layer to expose the drain electrode, thereby contacting the second connection pattern with the drain electrode;

forming a second contact hole passing through the gate insulating layer and the protective layer to expose the common line, thereby contacting the vertical part of the pixel electrode and the second connection pattern;

forming a third contact hole passing through the gate insulating layer and the protective layer to expose the vertical part of the pixel electrode, thereby contacting the vertical part of the pixel electrode with the finger part thereof and forming a fourth contact hole passing through the gate insulating layer and the protective layer to expose the common line, thereby contacting the common line with the common electrode.

4. The method according to claim 1, further comprising:

forming a storage capacitor having a lower storage electrode extended from the common line, and an upper storage electrode overlapping the lower storage electrode with at least one layer of insulating layer therebetween and connected to the pixel electrode.

5. The method according to claim 4, wherein forming the common electrode and the finger part of the pixel electrode on the protective layer includes:

forming said finger part of the pixel electrode and said common electrode positioned between the lower storage electrode and the pre-stage gate line in parallel to each other in a first direction; and forming said common electrode positioned between the lower storage electrode and the gate line in parallel to each other in a second direction that is different from said first direction.

* * * * *